(12) United States Patent
Myer et al.

(10) Patent No.: US 7,403,772 B2
(45) Date of Patent: Jul. 22, 2008

(54) TELECOMMUNICATIONS SYSTEM WITH REFLECTIVE AIRBORNE PLATFORM

(75) Inventors: Robert Evan Myer, Denville, NJ (US); Louis J. Lanzerotti, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 791 days.

(21) Appl. No.: 10/425,963

(22) Filed: Apr. 30, 2003

(65) Prior Publication Data

US 2004/0219877 A1 Nov. 4, 2004

(51) Int. Cl.
*H04B 7/15* (2006.01)
*H04Q 7/20* (2006.01)

(52) U.S. Cl. ...................................... 455/431
(58) Field of Classification Search ................. 455/431, 455/7–25
See application file for complete search history.

(56) References Cited

U.S. PATENT DOCUMENTS

| | | | |
|---|---|---|---|
| 3,746,282 A | 7/1973 | Vorachek | |
| 4,704,732 A * | 11/1987 | Csonka | 455/12.1 |
| 5,104,059 A | 4/1992 | Rand et al. | |
| 5,870,681 A | 2/1999 | Myer | |
| 6,324,398 B1 | 11/2001 | Lanzerotti et al. | |
| 6,382,557 B1 | 5/2002 | Lafuma et al. | |
| 6,941,138 B1* | 9/2005 | Chang et al. | 455/427 |
| 2002/0111174 A1* | 8/2002 | Judson et al. | 455/456 |
| 2002/0142717 A1* | 10/2002 | Morimoto | 455/11.1 |
| 2004/0092258 A1* | 5/2004 | Hibbs et al. | 455/431 |

FOREIGN PATENT DOCUMENTS

| | | |
|---|---|---|
| EP | 1 107 484 A1 | 6/2001 |
| GB | 2 280 569 A | 2/1995 |
| WO | WO 97/33790 | 9/1997 |
| WO | WO 98/51568 | 11/1998 |

OTHER PUBLICATIONS

European Search Report Dated Jul. 16, 2004.

* cited by examiner

*Primary Examiner*—Philip J Sobutka (57) ABSTRACT

A cellular-type wireless communications system, comprising: an airborne platform that reflects wireless communication signals; and a centralized base station associated with at least one cell, each cell corresponding to a geographic area, the centralized base station configured to send wireless communication signals to the airborne platform and receive wireless subscriber signals which have reflected down off of the airborne platform.

17 Claims, 6 Drawing Sheets

TELECOMMUNICATIONS SYSTEM WITH REFLECTIVE AIRBORNE PLATFORM

BACKGROUND

1. Technical Field

The present disclosure relates generally to telecommunications and more particularly to a wireless telecommunications system.

2. Description of the Related Art

Figure 1:
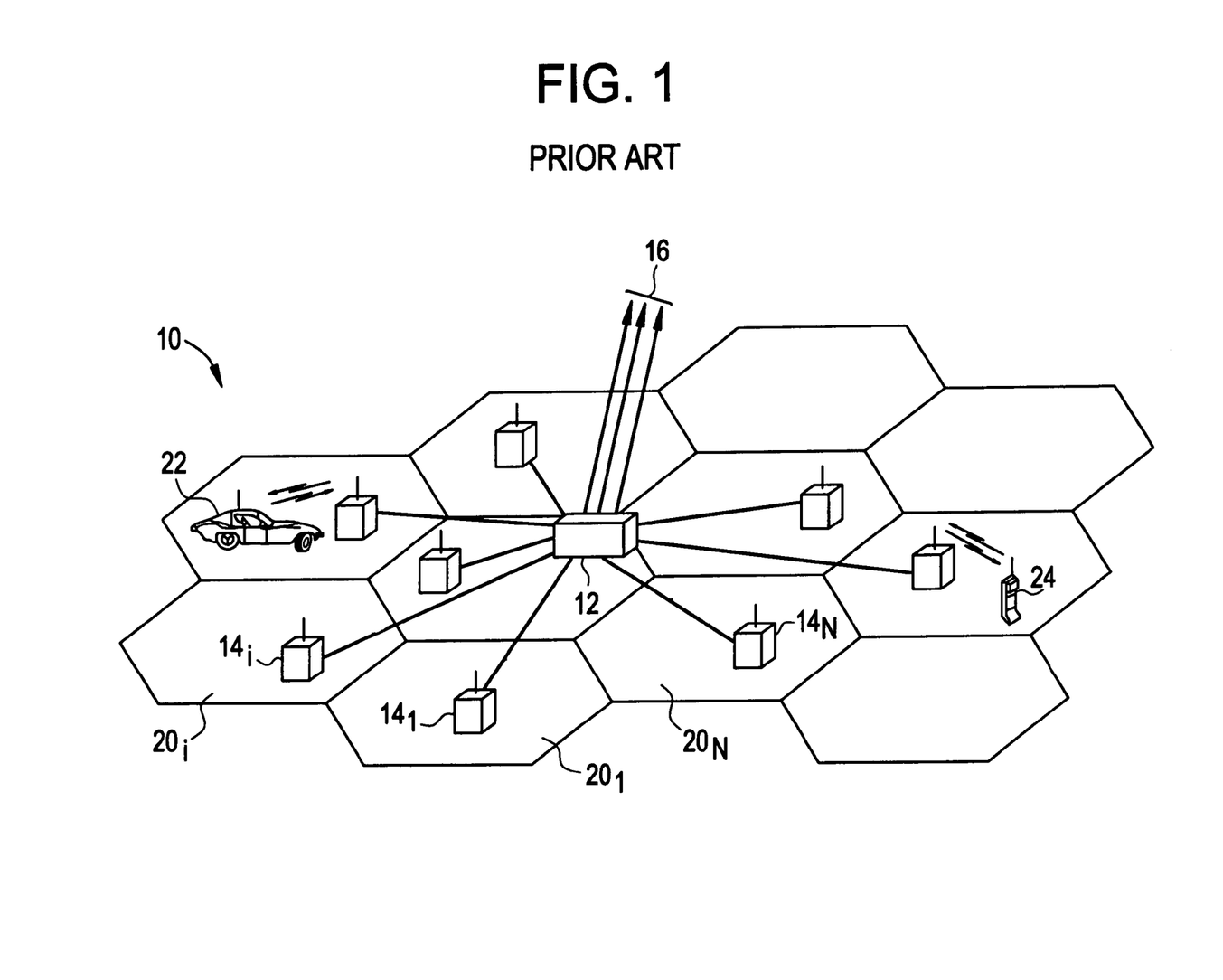
FIG. 1 is a schematic diagram of a prior art wireless telecommunications system.

FIG. 1 depicts a schematic diagram of a portion of a typical wireless telecommunications system designated generally as 10. System 10 serves a number of wireless terminals 22 and 24 that are situated within a geographic area. System 10 includes wireless switching center 12 that is connected to a number of base stations $14_i$ and local and long distance telephone networks 16. Wireless switching center 12 routes or "switches" calls from and to wireless terminals or, alternatively, between a wireless terminal and a wireline terminal connected to wireless system 10, via local and/or long distance telephone networks 16.

The geographic area serviced by wireless system 10 is partitioned into a number of spatially distinct areas called cells. As depicted in FIG. 1, each cell $20_i$ is schematically represented by a hexagon. In practice, however, each cell $20_i$ usually has an irregular shape that depends, for example, on the topography of the terrain serviced by system 10. Typically, each cell $20_i$ contains a corresponding base station $14_i$. Base station $14_i$ includes antennas and radios to communicate with wireless terminals 22 and 24. Each base station $14_i$ also includes transmission equipment to communicate with wireless switching center 12.

In designing system 10, engineers allocate a limited number of frequency channels to each base station $14_i$ using well known techniques. Base stations $14_i$ communicate with wireless terminals over these frequency channels. Thus, the number of base stations limits the potential capacity of system 10 for processing calls to and from wireless terminals.

As wireless telecommunications have increased in popularity, designers have developed techniques for increasing the capacity of these wireless telecommunications systems. One common technique is to reduce the size of each cell by "splitting" existing cells into multiple cells. Some designers have even suggested reducing the size of cells to provide so called "microcells" that service very small geographic regions.

The public has resisted use of microcells for several reasons. First, many people fear that electromagnetic radiation from base stations could cause health problems. Further, real estate in populated areas is typically expensive and accounts for about half the cost of the base station. Thus, it is a difficult and expensive proposition to split cells to increase capacity of a wireless telecommunications system.

SUMMARY OF THE INVENTION

In an exemplary embodiment of the invention, a telecommunication system uses an airborne platform that is adapted to reflect communication signals between a centralized base station and subscribers. The airborne platform is maintained in position relative to the ground above a geographic region of the earth to which the wireless telecommunications service is to be provided.

BRIEF DESCRIPTION OF THE DRAWINGS

An illustrative embodiment of the present invention is described below in conjunction with the accompanying drawings in which.

DETAILED DESCRIPTION OF PREFERRED EMBODIMENTS

Figure 2:
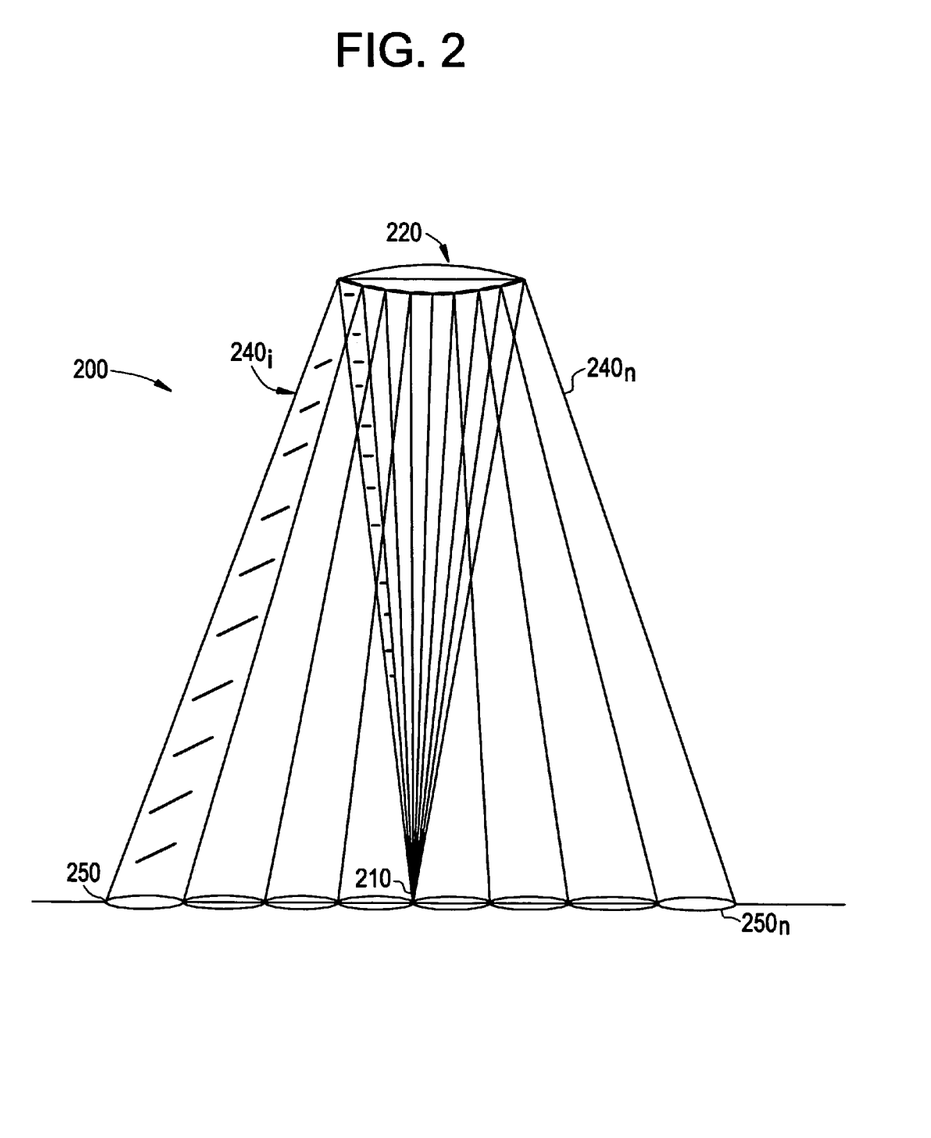
FIGS. 2 and 3 illustrate exemplary embodiments of a wireless telecommunications system according to the present invention.
Figure 3:
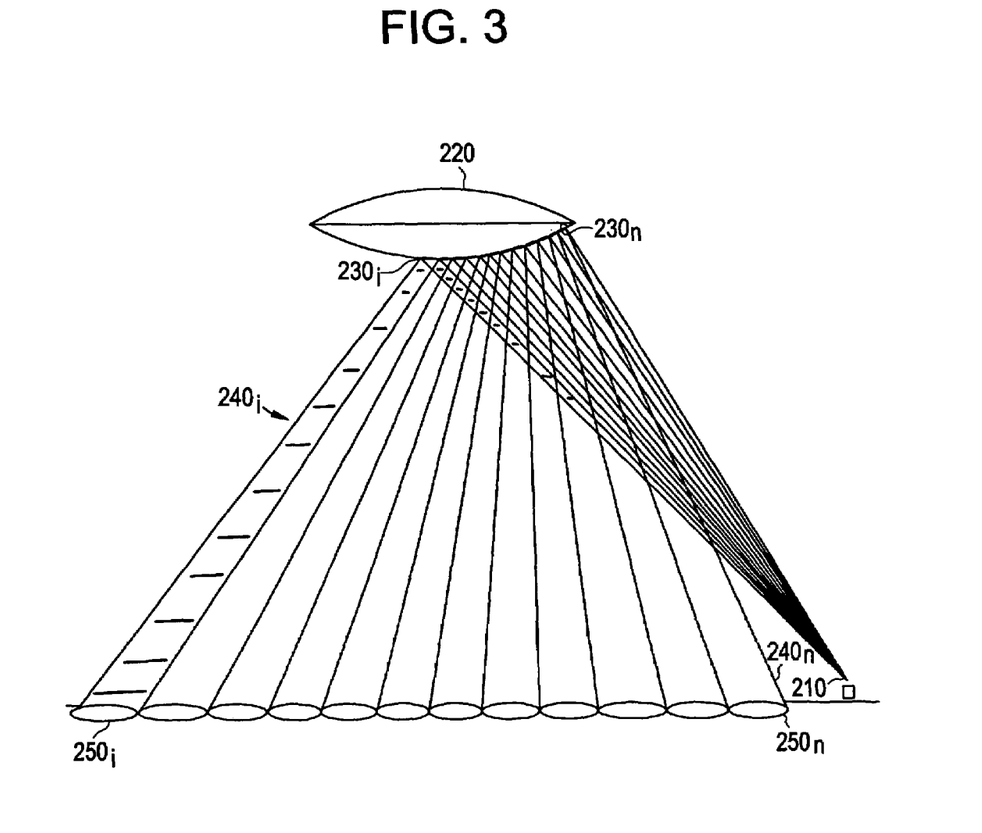

FIGS. 2 and 3 illustrate exemplary embodiments of a wireless telecommunications system according to the present invention. It is to be understood that these wireless telecommunications systems are intended to encompass any wireless communications system utilizing a wireless communication terminal, e.g., cellular, personal communication system (PCS), etc.

As shown in FIG. 2, a wireless telecommunications system 200 includes a centralized base station 210 and an airborne platform 220.

The wireless telecommunications system 200 in one implementation is used to provide a communication system to many geographic areas. Moreover, wireless telecommunications system 200, in another implementation, provides temporary communications within a geographic area in which telecommunications capability has been lost. Wireless telecommunications system 200, in another implementation, is used to provide emergency telecommunications within a geographic area having limited telecommunications capability. To accommodate such a scenario, a centralized base station 210 and a platform 220 may be positioned to take over communications for a given geographic area.

Telecommunications system 200 is also advantageous in that one centralized base station 210 may service a plurality of cells. The centralized base station 210 is associated with at least one cell, each cell corresponding to a geographic area. This is beneficial where placement of base stations is problematic due to terrain, limited space, resistance by a local population, or costs of deployment. With one centralized base station 210, many of these problems may be overcome. For example, in highly populated areas, such as urban areas, a centralized base station 210 may be placed in a rural area while an airborne platform 220 could be over the urban area to reflect mobile signals to mobile subscribers in the urban environment. The centralized base station 210 may also be positioned outside the cells to which it is associated. The invention provides significant benefit as well to localities near bodies of water where the airborne platform 220 is positioned over the body of water to service bordering localities. The invention also helps reduce signal blockage due to tall buildings, in part, because the signals may come from above the mobile subscriber.

Moreover, where quick installation is important, a centralized base station 210 and airborne platform 220 may be quickly deployed at minimal cost to service an area. The deployment of one centralized base station 210 and airborne platform 220 covering many cells is much easier to install than many base stations $14_{i-n}$ for the same number of cells.

As further shown in FIG. 2, the centralized base station 210 communicates with subscriber terminals located in each of the cells $250_{i-n}$ via communication paths $240_{i-n}$ that are reflected off airborne platform 220.

The airborne platform 220 may advantageously be positioned at an altitude not routinely occupied by military or commercial air traffic. As used herein, the term "airborne" means carried by or through the air and includes flight within the atmosphere, i.e., flight occurring between the troposphere and the edge of the thermosphere. This is in contrast to "spaceborne" which includes flight beyond the atmosphere of the earth. Ideally, airborne platform 220 is located floating in the stratonull within the stratosphere, and positioned 15 to 20 miles above sea level. The stratonull is advantageous because it is generally quite stable and is located above the troposphere where weather phenomena affecting the environment take place.

The centralized base station 210 and airborne platform 220 are associated with a plurality of cells $250_{i-n}$ located at ground level and a plurality of communication paths $240_{i-n}$. This arrangement provides for a communication path $240_i$ from the centralized base station 210 upward to the reflective airborne platform 220 and downward to subscriber terminals located in a corresponding cell $250_i$. A similar but reverse path is available for subscriber terminals within the cell $250_i$. The subscriber terminals may be wireless telephony devices that are either mobile or stationary.

FIG. 3 shows an embodiment of the present invention in which the airborne platform 220 is not directly over the centralized base station 210, but is instead offset from the centralized base station 210. Because of the location of airborne platform 220, centralized base station 210 may be located in a rural area where real estate costs and public resistance are minimal.

Figure 4:
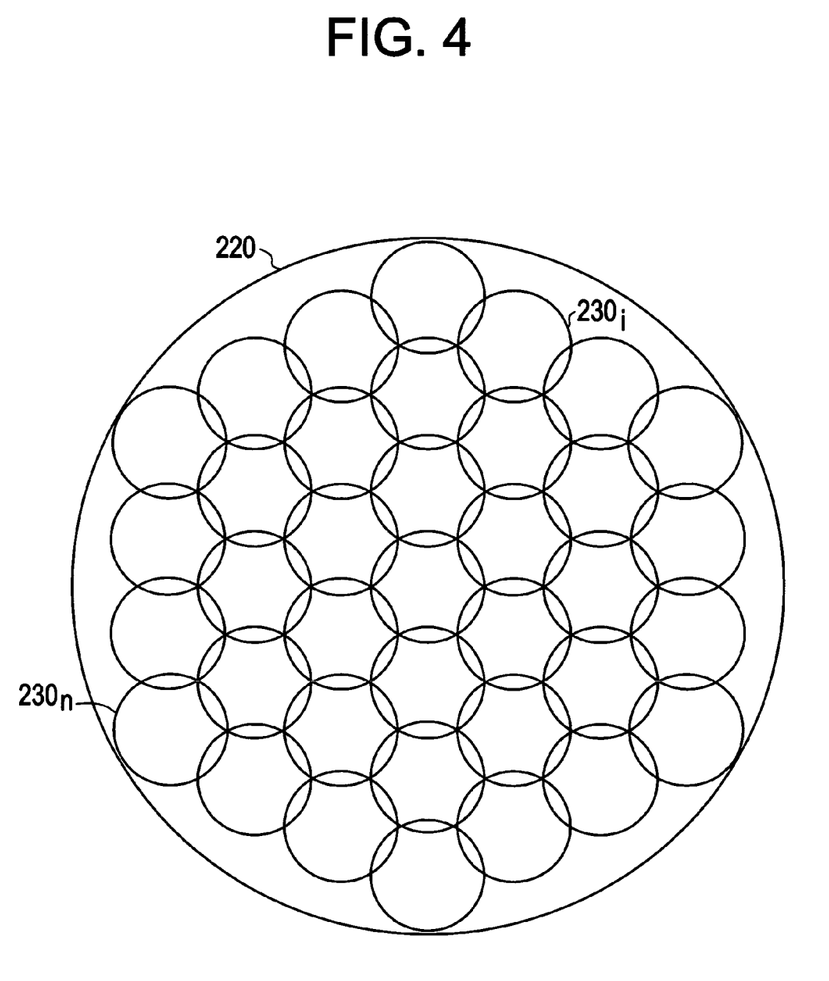
FIG. 4 illustrates an exemplary embodiment of communication path footprints on the bottom of an airborne platform.

FIG. 4 shows an embodiment of footprints $230_{i-n}$ on the bottom of the airborne platform 220 where 37 communication paths $240_{i-n}$ are reflected. The size of each footprint $230_{i-n}$ varies depending on the desired size of each cell $250_i$ and the bottom surface area of airborne platform 220. The bottom surface area of airborne platform 220 includes a reflective surface capable of reflecting communication signals such as wireless communication signals and wireless subscriber signals.

For example, a telecommunications engineer may wish to cover an approximate 15 mile$^2$ area on the ground with 19 equal size communication cells. One implementation an engineer may use to accomplish this is to use a narrow beam of 1° transmitted for each cell with the airborne platform 220 positioned approximately 15 miles above sea level and directly above the centralized base station 210. For each 1° beam projected onto the airborne platform 220, each footprint on the airborne platform 220 would be approximately equal to 15 Sine 1° which is approximately a 0.26 mile diameter for each footprint $230_{i-n}$. In a configuration similar to FIG. 4 where each of the 19 cells have an associated footprint $230_i$ on airborne platform 220, the bottom diameter of airborne platform 220, given the above conditions, may be as wide as 5 footprints $230_i$ or approximately 1.3 miles.

Overlap of communication path footprints $230_{i-n}$ on the bottom of the airborne platform 220, an increase in the curvature of the bottom of the airborne platform 220, or a decrease in the beam width of the communication paths $240_{i-n}$, either separately or combined, may aid in decreasing the reflective bottom area of airborne platform 220 that may be used to support a specific geographic area with cell footprints $250_{i-n}$. Moreover, an increase in the curvature of the airborne platform can increase the geographic area covered by cell footprints $250_{i-n}$.

While one airborne platform 220 may be used in a communication system, several airborne platforms 220 may be used to distribute the load from one centralized base station 210. The distributed airborne platforms 220 may be tethered together, grouped by a netting, or free floating. Furthermore, the airborne platforms, while distributed, may all be reflecting communication signals from one centralized base station 210.

Figure 5:
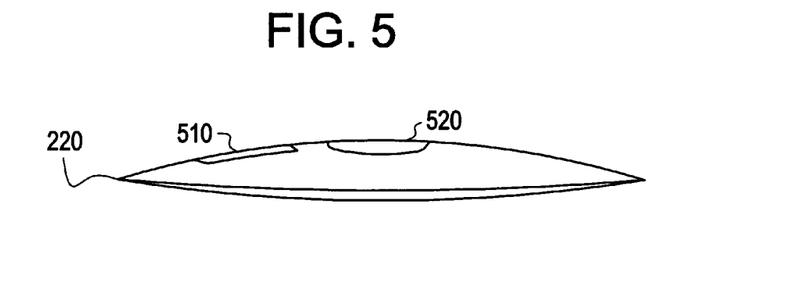
FIGS. 5 and 6 illustrate exemplary embodiments of an airborne platform.
Figure 6:
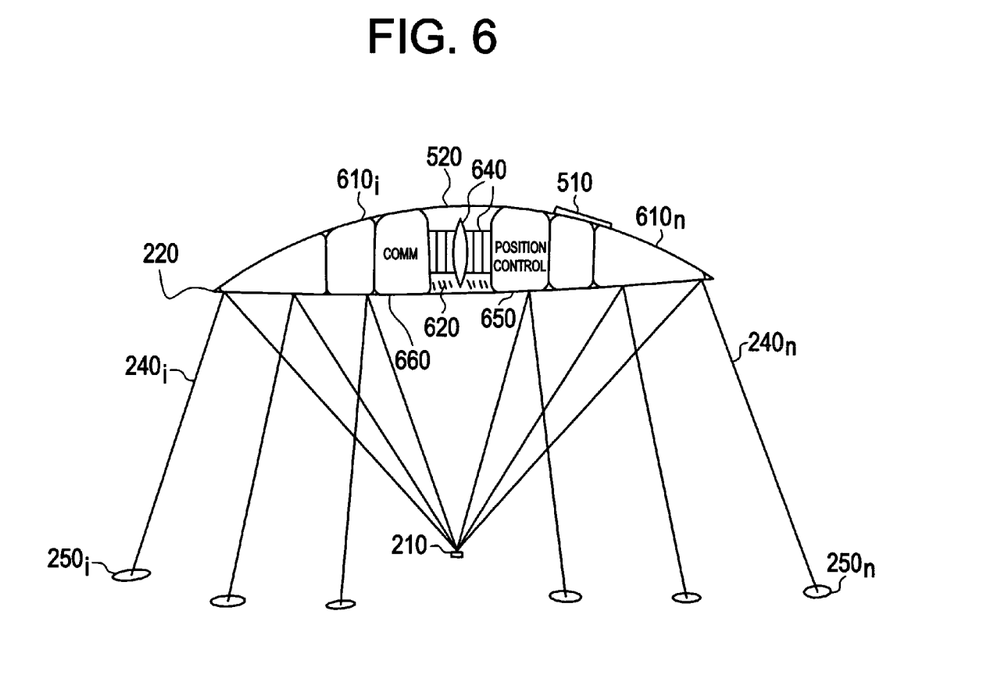

FIGS. 5 and 6 show an airborne platform 220 according to another embodiment of the invention. Airborne platform 220 has a streamlined body as shown to facilitate horizontal movement while minimizing the effect of winds on platform 220.

The top of the airborne platform 220 includes solar panels 510 to provide energy to the airborne platform 220. Platform 220 also includes a maneuvering system including an air intake 520 for a propulsion system 640, a ballast system, or both. While this embodiment includes an air intake 520 centered on top of the platform 220, there may be more than one air intake 520 positioned at various positions of airborne platform 220. Where an air intake or air output is on a reflective surface, a mesh may be placed over the air intake 520 or air output to allow air to pass through while still providing reflective characteristics.

The airborne platform 220 may also be a balloon, such as disclosed in J. J. Vorchek, U.S. Pat. No. 3,746,282 issued Jul. 17, 1973 and J. L. Rand et al., U.S. Pat. No. 5,104,059 issued Apr. 14, 1992, both incorporated by reference in their entirety. These high altitude balloons are capable of maintaining altitudes greater than 120,000 feet above sea level for periods of time exceeding several months while supporting a payload.

While the platform 220 supporting the centralized base station 210 in a wireless telecommunications system 200 may be able to sustain long range operations, several platforms may be rotated in shifts to service a geographic area. By maneuvering another platform near the first platform 220 and reorienting the antennas of the centralized base station 210 to the relieving platform 220, the system 200 is capable of a platform 220 hand-off. Handoffs are coordinated by the centralized base station 210. Subsequently, all communication sessions with wireless terminals would be handled by the relief airborne platform 220.

FIG. 6 shows an embodiment of a cross-sectional view of the airborne platform 220. The airborne platform 220 of FIG. 6 includes the elements of FIG. 5 and further includes a gas compartment 610, louvers 620, propulsion system 640, position control system 650, and ground communication system 660.

Gas compartments $610_{i-n}$ are distributed in various locations of the airborne platform 220 and may include Helium or another lighter than air gas or gases to help provide lift and enhance the maneuverability of the airborne platform. The compartmentalization of gasses helps reduce the risk of system failure if the airborne platform 220 is punctured or a leak is present. Some of the gas compartments $610_{i-n}$ may also be ballast compartments. The gas compartments $610_{i-n}$ used as ballast compartments inhale and exhale air external to the platform 220 to introduce and eliminate ballast. The control of ballast assists in controlling the airborne platform's stability.

Propulsion system 640 is used to assist in maneuvering the platform 220. Propulsion system 640 may be in the form of propeller driven by an electric motor. A power supply, such as the solar cell array 510, is positioned on the top of the platform to supply energy during daytime to drive propulsion system 640 and to charge batteries within the platform 220. Batteries may be used to supply energy to propulsion system 640 during nighttime flight. Although platform 220 is disclosed as having propulsion system 640 including a propeller driven by an electric motor, an appropriate propulsion system capable of maintaining platform 220 in a substantially stationary position over the earth may be used, e.g., jet engine, rocket engine, ion engine, etc.

Louvers 620 are used to channel air flow from the propulsion system 640 in different directions to assist in maneuvering. A maneuvering system includes the propulsion system 640 and louvers 620 to help maneuver and position the airborne platform 220 relative to the ground above the geographic area serviced by airborne platform 220 at an altitude at least 15 miles above sea level. Good performance occurs at 15 to 20 miles above sea level.

Position control system 650 helps the airborne platform 220 detect that it is in an undesirable position using a global position system (GPS) or other position determining system such as an inertial navigation system or a navigation system that uses the position of extraterrestrial bodies to determine position. The airborne platform 220 sends the position information to the centralized base station 210 and awaits position control information. Alternatively, the position control system 650 may not include position detecting equipment. Instead, the airborne platform 220 receives position control information generated at the centralized base station 210. Alternatively, the position control system 650 may generate the position control information and send it directly to the airborne platform 220 maneuvering system. The maneuvering system of the airborne platform 220 processes and maneuvers the airborne platform 220 according to the position control information.

Communication system 660 helps the airborne platform communicate control information with the centralized base station 210. This control communication between the airborne platform 220 and the centralized base station 210 may be in the form of an infra-red, microwave, optical, or other electromagnetic communication system.

Figure 7:
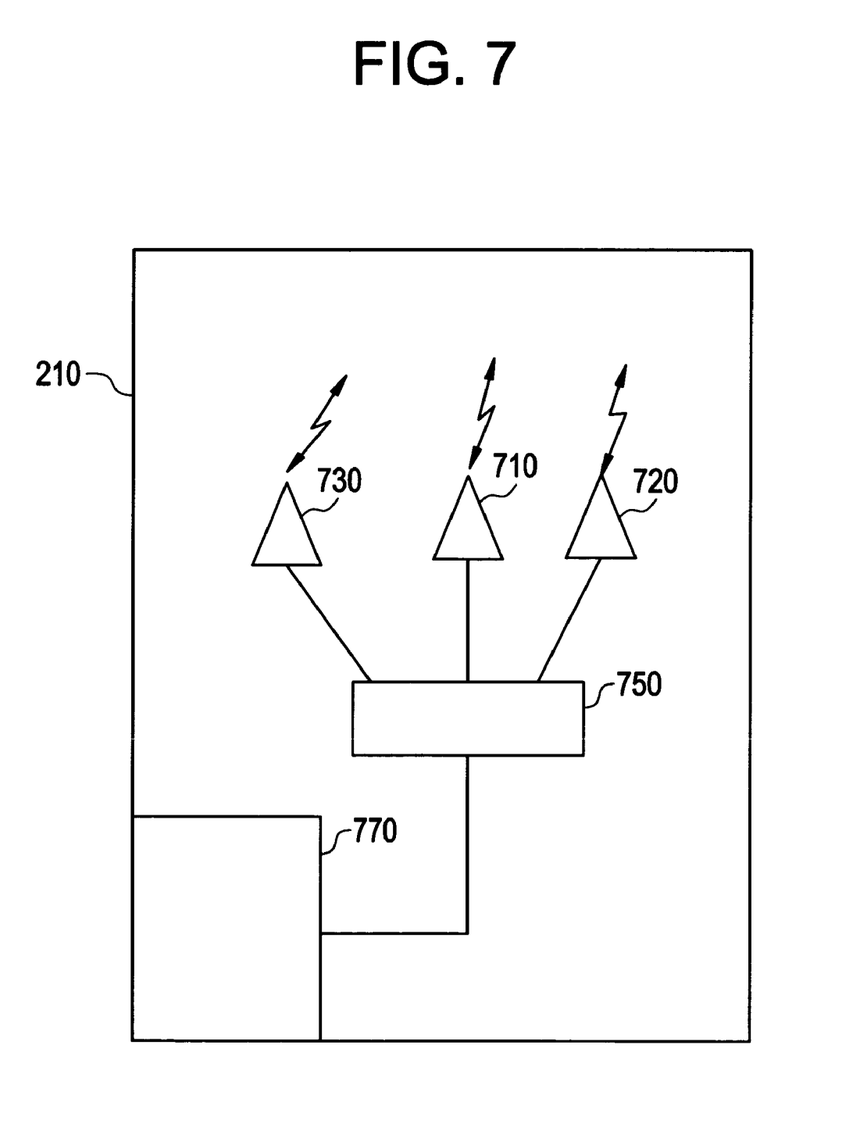
FIG. 7 illustrates an exemplary embodiments of a centralized base station.

FIG. 7 illustrates an embodiment of the centralized base station 210 according to an embodiment of the present invention. The centralized base station 210 is configured to send wireless communication signals to the airborne platform 220 and receive wireless subscriber signals which have reflected down off of the airborne platform 220. As shown, the centralized base station 210 includes a controller 750 connected to an antenna system 710, an airborne platform locator 720, an optional communication system 730 and a backbone interface 770. The controller 750 performs several functions such as handling wireless communication, orientation of directional antennas, and operation of the airborne platform 220. Each of these functions will be described in detail below.

In handling wireless communication, the controller 750 performs the same operation as one or more base stations in handling communication with mobile stations (not shown). Also, in one exemplary embodiment, the controller 750 performs the operation of a mobile switching center (MSC). When being used as an MSC, the centralized base station 210 is additionally used to monitor calls, gather billing information, etc. When communicating with a MSC (not shown), another base or centralized base station, or a PSTN, the controller 750 communicates via the backbone interface 770. The backbone interface 770 provides translation services allowing elements of the telecommunications system 200 to communicate with external telecommunications systems. In communicating with the mobile stations, the controller 750 transmits and receives signals via the antenna system 710.

The antenna system 710 includes one or more directional antennas depending on how many cells are to be supported. These directional antennas are configured to transmit wireless communication signals and receive wireless subscriber signals. Antenna system 710 may be implemented with narrow beam directional antennas that emit a narrow beam in an assigned range, for example, of 824 to 894 MHz(cellular) or 1900 to 2000 MHz (PCS). For example, the antennas may be a narrow beam helix antenna such as those used on a Navstar global positioning satellite. Similar helix antennas are further discussed in Antennas, 2d, John D. Kraus, pages 270 and 271. Narrow beam transmissions are advantageous because their reflected footprint is relatively predictable. For example, a narrow beam transmission is used to create a cellular footprint for a given geographic area. Moreover, narrow beam transmissions facilitate a more uniform distribution of low level RF power reducing radiation levels in populated areas.

The antenna system 710 sends communication signals to mobile devices via reflection off of the airborne platform 220 and receives from wireless subscribers signals from mobile devices via reflection off the airborne platform 220. The mobile devices (e.g., a mobile phone, PDA, etc.) include specialized antennas that receive wireless communication signals from above as well as transmit wireless subscriber signals in a skyward direction. The transmission by the mobile device may be directional and of very broad or narrow width. A broad transmission beam width (e.g., 180°) allows the mobile device to be maneuvered in many directions with its antenna generally directing signal to the airborne platform 220.

The controller 750 also controls the antenna system 710 to enhance its alignment with the airborne platform 220. Specifically, the controller 750 receives position information on the airborne platform 220 via the airborne platform locator 720. The controller 750 then determines the position of the airborne platform 220, generates antenna control information based on the position of the airborne platform 220, and adjusts antennas in the antenna system 710 based on the antenna control information. The airborne platform locator 720 includes a radar system or other system that uses reflected signal strengths received from the airborne platform 220 to help determine the position of the airborne platform 220.

The controller 750 can also monitor and/or control the operation of the airborne platform 220. In one exemplary embodiment, the controller 750 generates and sends position control information to the airborne platform 220 when controller 750 has determined, based on the position information from the airborne platform locator 720, that the airborne platform 220 has moved to an undesirable position. Alternatively, the controller 750 may receive airborne platform 220 position information from the airborne platform 220, and generate the position control information based on this received position information. Other information may also be exchanged between the controller 750 and the airborne platform 220 such as system status information and internal system control information.

In one exemplary embodiment, this information is sent to and received from the airborne platform via the antenna system 710. In another exemplary embodiment, the centralized base station 210 is configured to exchange the information with the airborne platform 220 using the base/platform communication system 730. The exchange of information occurs via a communications link between the base/platform communication system 730 and the communication system 660 of the airborne platform 220. The base/platform communication system 730 and complimentary communication system 660, may be a microwave system, other RF system, optical system, or narrow beam system.

In addition to the above configurations, communication between the centralized base station 210 and another centralized base station may also be accomplished via a communication link reflected by airborne platform 220 or other airborne platform. In a geographic area having a limited long distance telephone network, such as some third world countries, inter-centralized base station 210 communication via airborne platforms 220 may be used to provide long distance telecommunications.

Furthermore, it may become necessary to replace one airborne platform 220 with another. At this time, the controller 750 can take on the additional task of orchestrating a hand off from one airborne platform 220 to another. This could be accomplished by controlling the movements of both airborne platforms 220 and/or by controlling the orientation of the directional antennas in the antenna system 710.

The communication system according to the present invention allows for the placement of a centralized base station in an isolated area such as a rural area; less environmental damage than that which sometimes accompanies a distributed antenna deployment, a quick deployment of a telecommunication system in a given area, a relatively inexpensive telecommunication system, reduced electro-magnetic radiation in communications between a base station and a mobile device, and reduced power requirements for mobile devices.

It is to be understood that the above description presents illustrative embodiments only. Numerous other arrangements may be devised by one skilled in the art without departing from the scope of the invention.

What is claimed is:

1. A wireless communications system comprising:
a platform for reflecting from an airborne position wireless communication signals and wireless subscriber signals; and
a base station associated with at least one cell and positioned outside the at least one cell, the base station for sending the wireless communication signals to the platform and for receiving the wireless subscriber signals reflected off the platform.

2. The system of claim 1 wherein,
the platform includes a reflective surface for reflecting from an airborne position wireless communication signals sent from the base station and for reflecting from an airborne position wireless subscriber signals.

3. The system of claim 1 wherein,
the base station includes a base communication system for exchanging control information with the platform; and
the platform includes a communication system for exchanging control information with the base station.

4. The system of claim 1 wherein, the base station comprises:
at least one directional antenna for transmitting the wireless communication signals and for receiving the wireless subscriber signals.

5. The system of claim 4, wherein the directional antenna comprises a narrow beam directional antenna.

6. The system of claim 4, wherein the base station comprises:
a platform locator configured for determining a position of the platform; and
a controller for controlling an orientation of the directional antenna based on output from the platform locator.

7. The system of claim 6, wherein the platform locator comprises a radar.

8. The system of claim 1 wherein the base station comprises:
a platform locator for determining a position of the platform; and
a controller for controlling a position of the platform based on output of the platform locator.

9. The system of claim 8, wherein the platform locator comprises a radar.

10. The system of claim 8, wherein the base station comprises:
a communication system for communicating with the platform; and wherein
the controller controls the position of the platform by sending position control information to the platform via the communication system.

11. The system of claim 10 wherein the base station comprises:
at least one directional antenna for transmitting the wireless communication signals and for receiving the wireless subscriber signals.

12. The system of claim 1, wherein the base station comprises:
a communication system for communicating with the platform; and
a controller for receiving position information from the platform via the communication system, for generating position control information, for controlling a position of the platform based on the position information, and for sending the position control information to the platform via the communication system.

13. The system of claim 12 wherein the base station comprises:
at least one directional antenna for transmitting the wireless communication signals and for receiving the wireless subscriber signals.

14. The system of claim 1, wherein the base station is associated with a single cell.

15. The system of claim 1, wherein the base station is associated with a plurality of cells.

16. The system of claim 1, wherein the base station is positioned outside all cells the base station is associated.

17. The system of claim 1 wherein, the platform floats at least 15 miles above sea level.

* * * * *